UNITED STATES PATENT OFFICE.

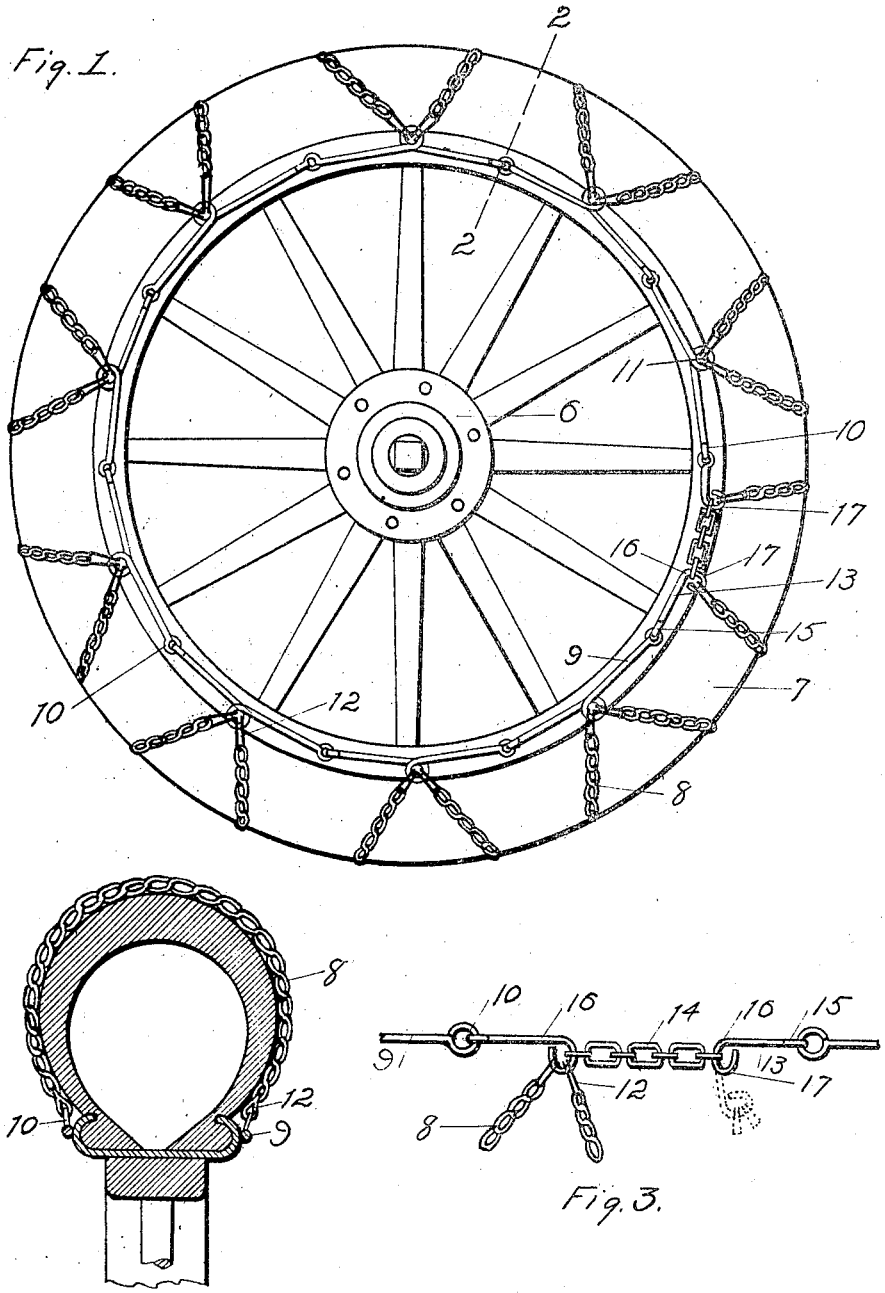

ALDON R. CORRINGTON, OF HARTLEY, IOWA.

TIRE-GRIP.

957,309.

Specification of Letters Patent.  Patented May 10, 1910.

Application filed July 7, 1908. Serial No. 442,370.

*To all whom it may concern:*

Be it known that I, ALDON R. CORRINGTON, citizen of the United States, residing at Hartley, in the county of O'Brien and State of Iowa, have invented certain new and useful Improvements in Tire-Grips, of which the following is a specification.

This invention relates to means for preventing the slipping of wheels of motor vehicles, and particularly to tire-grips of that class using chains extending across the tire.

The object of the invention is to provide improved means for holding such chains in place on the tire and for fastening the same to the holding devices.

A further object is to provide a construction by means of which the chains can be readily taken off or repaired, and which will not let the chains or grip sag or become loose in the wheel or catch on any part of the car, which is injurious or destructive not only to the grip but also to the tire, and at times to the car. The device also has advantages of durability and cheapness, and freedom from breakage, and avoids chafing the tire.

Devices including chains for preventing slipping have heretofore been proposed, but many have been complicated, or deficient with respect to fit, or expensive with respect to original construction or to repair in case of breakage. The device forming the subject of this application is believed to remedy these defects, as more fully hereinafter pointed out.

The invention is illustrated in the accompanying drawings, in which,

Figure 1 is a side elevation of a wheel provided with the anti-slipping device. Fig. 2 is a cross section on the line 2—2 of Fig. 1. Fig. 3 is a detail illustrating the manner of connecting the rings which hold the chains.

Referring specifically to the drawings, 6 indicates a wheel such as commonly used in automobiles, and having a pneumatic tire 7. These parts may be of any ordinary or desired construction.

The grip comprises a series of pieces of chain 8 which extend diagonally or angularly across the tire, so as to prevent circumferential slip and also lateral skidding. These chains are held on the tire by rings at the sides thereof, each ring consisting of a series of sections 9 connected together by loops 10 at the ends thereof. The sections are comparatively long, so as to have as few joints as possible consistent with the application of the device to wheels of various sizes, and by reason of the few joints it will not wear out nor become loose as quickly as rings formed by chains having small links. Each section is made of heavy spring steel wire and is bent to form an eye 11 at or about the middle thereof. The ends of the chains are connected to these eyes by double links 12 made of tough metal, and cold shut, and capable of being easily replaced in case of breakage. For connecting the ends of each of the rings so formed, in such manner that the chains can be fitted to the wheel, and wear taken up, I provide hook devices 13 at the ends of the ring, connected by a short piece of chain 14. Each of these devices has a loop 15 at one end which is hooked into the loop 10 at the end of the ring section, and at the other end has an offset or hooked part 16, terminating in a loop 17, to which the tread chain is connected. The hook 16 extends through a link of the short chain 14.

In applying the grip to a wheel, the loop 15 at each side is unhooked from the loop 10, and the grip is laid flat along the ground. Then the wheel of the vehicle is run onto the grip, the ends of which are then brought up together. Then the end 15 of the hook device is passed through the link of the short chain 14 appropriate to draw the ring tight, and bind the chains snugly across the tire. This is illustrated in Fig. 3, and it will be seen that the hook device forms in effect a lever to draw the ends of the ring together, the tension being afforded, with respect to the loose end, by means of the diagonal chains. When fully strained, the hook device 13 is turned and the link of the short chain 14 slips along to the hook 16, after which the loop 15 can be caught in the loop 10 of the loose end section of the ring.

In case of breakage of any chain, the remaining chains and the connections described will hold the rings in place, and it is not necessary to remove the whole grip. No tools are necessary to apply or remove the grip, and there is an absence of screws and such other tighteners which are liable to become inoperative through rusting or injury and which require tools or devices for adjustment or operation. Wear may be taken up by detaching one of the parts 13 and moving it up to another link of the chain 14.

I claim:

A tire grip comprising opposing side rings, each formed of sections of metal wire intermediately bent to form eyes and connected at their ends by interengaging end loops, cross chains extending between the eyes of the opposite rings, connecting members at each of the ends of the rings, said members having at one of their ends loops to engage the end ring loops, and having at their opposite ends hooks terminating in loops, cross chains extending between the latter loops of opposite rings, and short chains connecting the hooks of each of the rings, said connecting members being movable through the end links of said short chains to draw their respective cross chains tight.

In testimony whereof I affix my signature in presence of two witnesses.

ALDON R. CORRINGTON.

Witnesses:
JOHN H. ONCKEN,
L. W. LANCASTER.